Nov. 12, 1929. F. D. FENHAGEN ET AL 1,735,455
PROCESS AND APPARATUS FOR FRACTIONAL CONDENSATION
Filed Feb. 12, 1921
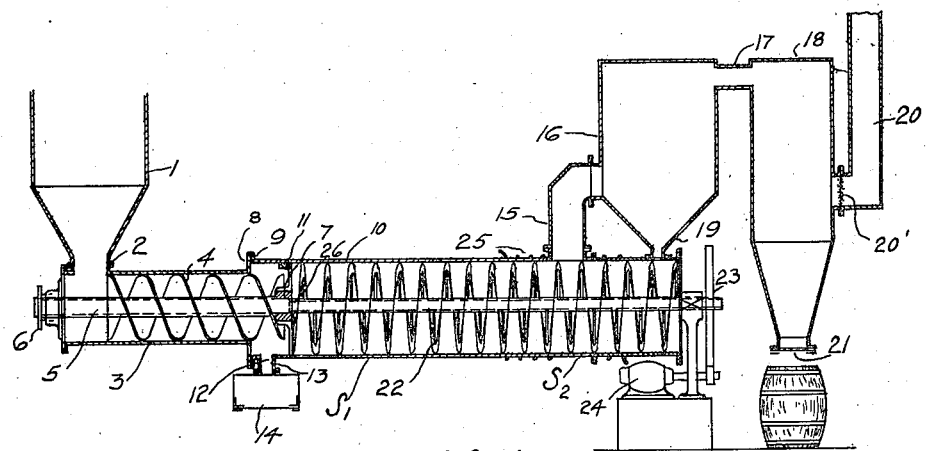
Fig.1.
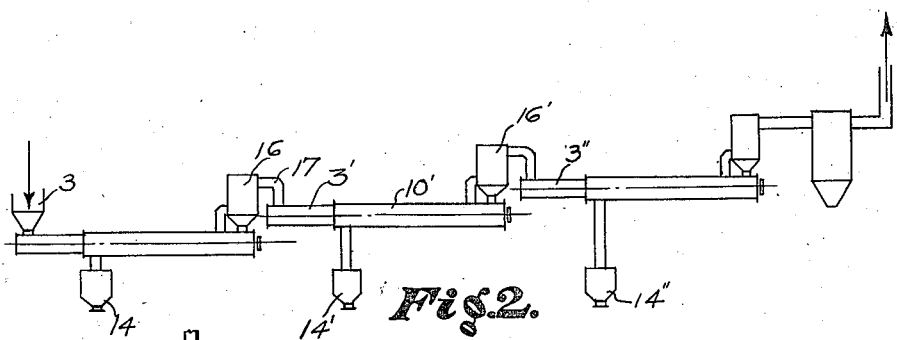
Fig.2.
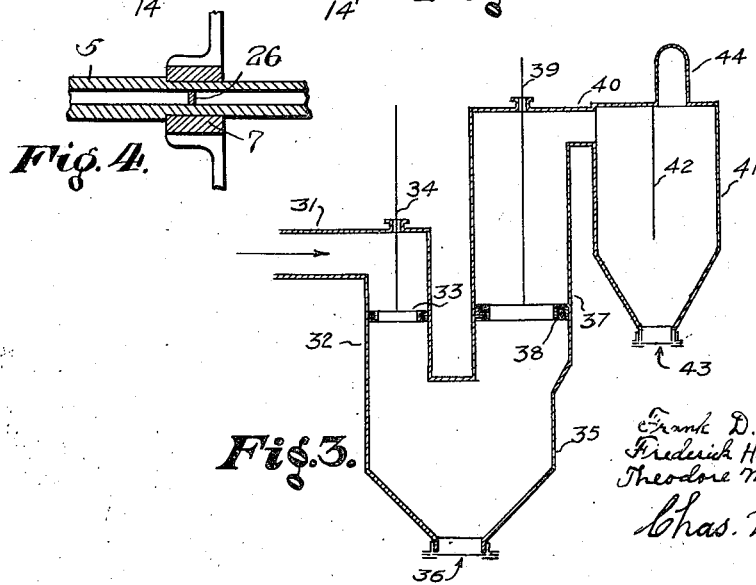
Fig.4.
Fig.3.
INVENTORS
Frank D. Fenhagen
Frederick H. Rhodes
Theodore M. Heuser
BY
Chas. W. Mortimer
ATTORNEY Patented Nov. 12, 1929

1,735,455

UNITED STATES PATENT OFFICE

FRANK D. FENHAGEN, OF FAIRMONT, WEST VIRGINIA, AND FREDERICK H. RHODES, OF ITHACA, NEW YORK, AND THEODORE M. HESSER, OF GERMANTOWN, PENNSYLVANIA, ASSIGNORS TO THE BARRETT COMPANY, A CORPORATION OF NEW JERSEY

PROCESS AND APPARATUS FOR FRACTIONAL CONDENSATION

Application filed February 12, 1921. Serial No. 444,600.

Our invention relates to a process and apparatus for separately condensing several normally solid substances from a gaseous mixture containing their vapors and has for its purpose the obtaining of one or more than one substantially pure solid substance from a gaseous mixture containing the vapors of two or more than two substances which are solid at ordinary temperatures.

It is well known that if any mixture of gases or vapors containing the vapor of any given substance is uniformly cooled, no condensation of that substance will occur until the gaseous mixture has attained the temperature at which the vapor pressure of the given substance becomes less than the partial pressure of the vapor of that substance in the gaseous mixture, which temperature will hereinafter be referred to as the "dew-point" of that component of the gaseous mixture.

If the separation of the condensed substance from the gaseous mixture occurs at a temperature above the melting point of the condensed substance, the latter will separate from the gaseous mixture as a liquid; but if the separation of the condensed substance from the gaseous mixture occurs at a temperature below the melting point of the condensed substance, the latter will separate from the gaseous mixture as a solid.

It has been found that if all portions of a gaseous mixture containing the vapors of two or more substances, which are mutually insoluble in the condensed form, are cooled equally, that substance of which the dew-point in the gaseous mixture is the highest will begin to condense first in a substantially pure form. The condensation of this substantially pure substance will continue while the heat is being removed until the dew-point of a second component in the gaseous mixture is attained. Cooling beyond this point will result in the condensation of a mixture of the two stated components until the dew-point of a third component is attained. Continued cooling will therefore successively condense all of the condensable vapors in the gaseous mixture up to the point where the partial pressure of each component of the gaseous mixture is equal to the vapor pressure of that component at the final temperature. If, due to unequal cooling, portions of the mixture reach temperatures below the dew-point of the substance having the next lower dew-point, a mixture of the substances will be condensed from said portions instead of only the substance having the higher dew-point.

If the resulting mixture of the two stated components in the solid form be heated in the presence of a gas or gaseous mixture not saturated with the vapor of one of the components of the said mixture, that is in the presence of a gas or gaseous mixture in which the vapor of one of the components of the said solid mixture is at a temperature above its dew-point or superheated, then this component will be revaporized until either the supply in the solid form is exhausted or the gas or gaseous mixture is saturated with, or has reached the dew-point of, the vapor of this substance.

It is apparent that if all parts of the original gaseous mixture are at a temperature above the dew-point of the vapor of that component having the next lower dew-point, then the mixture is not saturated with the vapor of that component. Now, if this hot, unsaturated, gaseous mixture and a mixture of the same substances in the solid form are brought into intimate physical contact, heat will be given up by the former and absorbed by the latter, thereby revaporizing from the solid mixture that component with the vapor of which the gaseous mixture is not saturated, provided that the gases are hotter than the solids, until the said gaseous mixture has become saturated with the vapor of, or has reached the dew-point of the vapor of the said component, or said component has become completely revaporized. The remaining component of the solid mixture will not be revaporized if the gaseous mixture is at a temperature below the dew-point of the vapor having the highest dew-point, and is therefore saturated with the vapor of the substance which has the highest dew-point.

If, therefore, the said mixture of the two stated components in the solid form is mechanically transferred from the region of its condensation to a region of the gaseous mixture where the temperature at all points is above the next lower dew-point, then the solid substance, the vapor of which has this said next lower dew-point in the gaseous mixture, will be revaporized, leaving the solid substance, the vapor of which has the highest dew-point in the gaseous mixture, in a substantially pure state.

In the accompanying drawings is shown in a somewhat diagrammatic form illustrations of apparatus that may be used in carrying out this invention. It is to be understood that the invention is not restricted to the particular forms of apparatus shown nor to the details of structure therein described. In the drawings Fig. 1 is a vertical section of an apparatus in which the process can be carried out.

Fig. 2 shows, on a smaller scale, several of the devices as shown in Fig. 1 connected in series.

Fig. 3 shows a modified form of apparatus in which the invention can be practiced.

Fig. 4 is a sectional view of a detail.

In the drawings reference character 1 refers to a feed or inlet for the material to be treated. The inlet 1 leads through a neck 2 to a pre-cooler 3, which is provided with a conveyor 4 mounted upon a hollow shaft 5 that is carried in bearings 6 and 7. The pre-cooler 3 is provided with a flange 8 which is connected to the flange 9 of the chamber 10 by means of an air-tight joint. The bearing 7 is carried by a spider 11 that is anchored on the inside of the chamber 10. A hole 12 is provided near the end of the chamber 10 from which a pipe 13 leads to a receptacle 14 for a purpose to be subsequently described.

The chamber 10 is also provided near the opposite end with an outlet 15 leading to a settling chamber 16, from which settling chamber 16 an outlet pipe 17 leads to another chamber 18. The chamber 16 is also provided with an outlet 19 at its lower part leading to the chamber 10 and an outlet 20 extends from the chamber 18 while the lower part of the same is provided with a gate or valve 21 for removing materials therefrom. The hollow pipe 5 extends through the chamber 10 and has mounted thereon to revolve therewith a conveyor 22, which carries materials in the direction opposite to conveyor 4. These conveyors 4 and 22 are revolved by means of the pipe 5 which is driven by a gear wheel 23, which in turn is driven by the motor 24 or other convenient means. The chamber 10 may, if desired, be provided with electrical heating means 25, or it may be heated in any other convenient way or it may be cooled, if desired. The hollow pipe 5 may be provided with a partition 26, thereby enabling heating fluid to be introduced into one end of this hollow pipe and cooling fluid to be introduced into the other end, when desired. The conveyors 4 and 22 respectively convey material toward the outlet 12, from which said material falls into the receptacle 14.

In Fig. 2 the outlet pipe 17 from the first device, as shown in Fig. 1, leads to the pre-cooler 3' of another similar device, which is in turn connected to a third pre-cooler 3" etc. for the desired number in series.

In Fig. 3 is shown a modification of the invention in which an inlet pipe 31 leads to a vertical pre-cooler 32 provided with a scraper 33 operated by the rod 34. The pre-cooler 32 leads to a chamber 35 provided with a gate or valve 36 in the lower part thereof, and extending from the upper portion of the chamber 35 is a chamber 37 also provided with a scraper 38 operated by the rod 39. A pipe 40 leads from the upper portion of chamber 37 to a settling chamber 41 which is provided with a baffle 42 across its upper portion and a valve or gate 43 in its lower part with an exhaust or outlet 44 at its upper part.

The operation is as follows:

A gaseous mixture containing the vapors of two substances that are to be separated from each other is introduced through the feed inlet 1. The temperature at all points of this mixture introduced through the feed inlet 1 is such that none of the vapors will be condensed in said inlet. The mixture enters the pre-cooler 3 where heat is extracted by conduction through the walls of the pre-cooler 3, or of the hollow pipe 5 or both. The amount of heat extracted may be regulated by varying the heat conductivity of the walls of the pre-cooler 3 or by regulating the temperature difference between the inside and outside of said pre-cooler, and also by regulating the temperature within pipe 5. By thus extracting heat from the mixed gases or lowering the temperature of the same, the temperature of the vapors is reduced to a point where their average temperature across a transverse section at the end of the pre-cooler 3 is just above the dew-point of the vapor of the substance having the highest dew-point, which vapor or substance will hereinafter be referred to as "A." Due to the fact that the temperature across the said transverse section may not be uniform, since heat is not removed equally from all points but principally around the circumference or at the center, certain local sections of the vapor mixture will be at a temperature below the dew-point of vapor A, and hence a certain amount of this substance will be condensed with the condensation of very little, if any, of the remaining substance or substances. The conveyor 4 collects the condensed material and conveys it to the end of the pre-cooler 3 opposite from that at which the vapors enter and discharges it into the chamber 10.

The vapor mixture on leaving the pre-cooler 3, enters the chamber 10, which will be called the fractional chamber, at substantially the temperature it was at the exit end of the pre-cooler 3. Heat is removed from the vapor mixture in its passage through chamber 10 by conduction through the walls or through the central pipe 5 which supports the conveyor 22, or the heat may be removed by any other suitable means. The amount of heat removed may be controlled, as hereinbefore mentioned for the pre-cooler, and in addition it may be removed in such a manner as to determine at will the rate at which the cooling of the vapor mixture will take place for a part of or the entire length of the chamber 10. In this way the temperature of the vapor mixture is caused to decrease gradually from the entrance of chamber 10 to some predetermined imaginary transverse dividing plane about midway of the length of the chamber where the average temperature of the vapor mixture over said plane is just above the dew-point of the vapor of the substance having the lower dew-point, which vapor or substance will be hereinafter referred to as "B." That section of the fractional chamber 10 on the entering side of said plane is designated as section $S_1$ of the fractional chamber 10, and the remaining section of the same as section $S_2$ of the fractional chamber. Due to the fact that the temperature across the said dividing plane and across other transverse planes in section $S_1$ is not uniform, as hereinbefore described for the pre-cooler 3, certain local sections of the vapor mixture, especially those near the dividing plane, will be at temperatures below the dew-point of vapor B, and hence a small quantity of the substance will be condensed along with a larger quantity of vapor A which will condense out at these portions of the section $S_1$ of the fractional chamber 10, due to the temperature of this vapor being below its dew-point in the vapor mixture. Although condensate of the substance B is present in small amounts in the total condensate obtained at these portions of the chamber or condensation zone 10, the proportion thereof is relatively large with respect to the proportion of this substance present in the condensate obtained in the high temperature portion of this condensation zone near the vapor inlet thereto. The conveyor 22 collects this mixture of solids A and B, and carries it back through section $S_1$ of the fractional chamber 10 and hence against the flow of the incoming vapor mixture, thereby increasing the temperature difference between the solids and vapors and causing the solids to absorb heat from the vapor mixture. The action of the conveyor 22 is preferably such that thorough and intimate contact is obtained between the solids and the vapors, so that all or substantially all of the substance B in the solid form being thus raised to a temperature above the dew-point of its vapor in the vapor mixture is revaporized from the mixture of said solids and again becomes part of the incoming vapor mixture, the remaining solid being substance A in a pure or substantially pure form. The conveyor 22 continues to carry back the remaining solid substance A and discharges it, together with the substance A from conveyor 4, through the outlet 12 into the receptacle 14. The substance collected in receptacle 14 may be removed periodically by any suitable means and this substance A constitutes one of the substantially pure products obtained by the operation of the apparatus.

The temperature in section $S_2$ of the fractional chamber 10 may be maintained throughout its length just above the dew-point of vapor B by the heating coil 25, or by other suitable means such as a steam jacket or steam coils, so that the temperature of the vapor mixture becomes uniform and no further condensation takes place in section $S_2$. This gaseous mixture contains, besides a preponderance of vapor B, a small amount of vapor A such that its partial pressure is equal to the vapor pressure of substance A at the said constant temperature in secton $S_2$.

The gaseous mixture leaves section $S_2$ through pipe 15 and enters the settling chamber 16, carrying in suspension some of the solid substance A in a finely divided form. The dust of substance A settles to the bottom of chamber 16 and slides through the outlet 19 into the section $S_2$ of chamber 10 where it is picked up by conveyor 22 and carried along with other solids that are collected in chamber 10 to the receptacle 14. The settling chamber 16 may be kept at the same temperature as that of section $S_2$ of fractional chamber 10. The gaseous mixture leaves the settling chamber 16 at the top thereof through pipe 17 substantially free from substance A in the solid form. There is no drop in temperature up to this point below the temperature of the gas at the dividing plane between sections $S_1$ and $S_2$. The gaseous mixture may then be introduced into the condensing chamber 18 where it may be rapidly cooled by radiation or by a cooling coil below the dew-point of vapor B, thus condensing nearly all of substance B from the gaseous mixture. The resulting substance B may be periodically removed by any suitable means through the valve 21, and the remaining gases, after being cleaned from all dust particles by means of the screen 20', are conducted away through the flue or stack 20.

The description above is for the separation of two substances from each other. If there are more than two substances to be separated from each other, a number of devices similar to that shown in Fig. 1 may be connected in series, as indicated in Fig. 2, in which case the substance of highest dew-point will be collected in receptacle 14, that of the second highest dew-point in receptacle 14', and that of the third highest dew-point in receptacle 14″, etc., as will be obvious from the description above.

In the use of the modification as indicated in Fig. 3 the vapor mixture will be introduced through pipe 31 into the pre-cooler 32, wheresome of the substance A will be condensed and collect in the bottom of receptacle 35 while more of substance A will be condensed in chamber 37 and will also by gravity settle in chamber 35, becoming purified of substance B in its descent through the hotter rising gases, due to the counterflow of solids and vapors, in a similar manner to that hereinbefore described for the apparatus shown in Fig. 1. If portions of the substance A cling to the walls of pre-cooler 32 and chamber 37, the same may be scraped off by means of the scrapers 33 and 38. The gaseous mixture will pass through the pipe 40 into the condenser 41 where it will be cooled and the substance B will settle to the bottom and may be withdrawn through the valve 43.

We claim:

1. In the process of obtaining a substantially pure solid condensate, the step which comprises the addition of heat to any impure condensate which may occur in the temperature zone where only substantially pure condensates can theoretically exist.

2. In the process of obtaining a substantially pure solid condensate, the step which comprises the addition of heat from a gaseous mixture to any impure condensate which may occur in the temperature zone where only substantially pure condensates can theoretically exist.

3. In the process of obtaining a substantially pure solid condensate, the steps which comprise providing a temperature zone where the desired condensate is formed and adding heat from a gaseous mixture to any impure condensate which may occur in said temperature zone.

4. In the process of obtaining a substantially pure solid condensate, the steps which comprise providing a condensing zone where the desired condensate is formed and adding sufficient heat to vaporize impurities in the condensate without vaporizing a substantial amount of the pure condensate itself.

5. In the process of purifying a mixture of solids condensed from a gaseous mixture containing their vapors, the step which comprises causing said solids to absorb heat from additional uncondensed gaseous mixture, the latter absorbing one or more of the components of the condensate as a vapor.

6. In the purification of a mixture of solid substances resulting from the condensation of several solid substances from a gaseous mixture containing their vapors, the steps which comprise bringing together the condensate and the uncondensed or partially condensed gaseous mixture, purifying the condensate by absorbing heat from said gaseous mixture, thereby vaporizing one or more of the components of the condensate.

7. The process which comprises condensing a plurality of solids which have different vaporizing points from a gaseous mixture containing their vapors, transferring said solids to a zone of sufficiently high temperature to vaporize one of said solids and removing the unvaporized solid.

8. The herein described process which comprises condensing a solid from a gaseous mixture containing vapors of materials that sublime, which comprises condensing a solid from said mixture and subsequently heating said solid by means of the uncondensed portion of said gaseous mixture.

9. The herein described process which comprises condensing solid material from a gaseous mixture and transferring said material to a hotter portion of said gaseous mixture than the portion from which said material was obtained.

10. The herein described process which comprises cooling a moving gaseous mixture to form a solid condensate and simultaneously moving said condensate in a direction counter to said moving gaseous mixture and in intimate contact therewith.

11. In an apparatus of the class described, a condenser, a conveyor in said condenser for carrying condensates in the direction of gas flow, a second condenser connected to said first-named condenser, a conveyor in said second condenser for carrying condensates contrary to the direction of gas flow.

12. The process of separating substances, which are relatively mutually insoluble in the condensed form, from a vapor mixture thereof which comprises passing said vapor mixture through a zone maintained at a temperature adapted to condense a mixed solid comprising a major proportion of one of said substances together with a minor proportion of another of said substances, and then passing the said mixed solid in a direction counter to the flow of said gas mixture, thereby increasing the proportion of the substance in the said mixed solid present therein in major proportion.

13. The process of separating substances, which are relatively mutually insoluble in the condensed form, from a vapor mixture thereof which comprises passing said vapor mixture through a condensation zone maintained at temperatures decreasing in the direction of flow of said gas so that a solid comprising one of said substances substantially free from any other substance of said vapor mixture having a relatively low condensation temperature is condensed in the high temperature region of said zone and so that a mixed solid containing said initially condensed substance in major proportion together with a minor proportion of a substance of said vapor mixture having a relatively low condensation temperature is condensed in the low temperature region of said zone, and then passing the mixed solid in a direction counter to the flow of said vapor mixture thereby increasing the proportion of the substance in said mixed solid present therein in major proportion.

14. The process of separating normally solid substances from a mixture of vapors of such substances, the separate components of said mixture having different condensation temperatures, which comprises flowing said vapor mixture into a portion of a condensation zone maintained at a temperature adapted to condense the vapor of highest condensation temperature as a solid relatively free from condensate of the vapor of lower condensation temperature, and then flowing the mixture into another portion of the condensation zone maintained at a relatively lower temperature adapted to condense said vapor of highest condensation temperature as a solid containing a relatively large quantity of the condensate of the vapor of lower condensation temperature, and then passing said last mentioned solid in a direction counter-current to the flow of said vapor mixture and in intimate contact therewith thereby decreasing the proportion present in said solid of the condensate of the vapor of lower condensation temperature.

15. The process of separating normally solid substances from a mixture of vapors of such substances having different condensation temperatures, which comprises flowing said vapor mixture into a condensation zone maintained, at a portion thereof, at a temperature adapted to condense the vapor of highest condensation temperature as a solid relatively free from condensate of the vapor of lower condensation temperature, and maintained, at another portion thereof, at a temperature adapted to condense said vapor of highest condensation temperature as a solid containing a relatively large quantity of the condensate of the vapor of lower condensation temperature, and then slowly mechanically transferring said last mentioned solid in a direction counter-current to the flow of said vapor mixture and in intimate contact therewith thereby decreasing the proportion present in said solid of the condensate of the vapor of lower condensation temperature.

16. In an apparatus for condensing materials from a vapor mixture and separating the condensate from the mixture, the combination of a condensing chamber for condensing said vapor mixture, a conveyor in said chamber for conveying the condensate in the direction of the flow of vapor mixture undergoing condensation, a second condensing chamber communicably connected to said first named condensing chamber, a conveyor in said second named chamber for conveying condensate in a direction counter-current to the direction of the flow of vapor mixture therein and a discharge port positioned adjacent the connection between the condensing chambers for discharge of condensate therethrough.

17. In combination, a condenser, a rotary conveyor in said condenser, said conveyor having a central hollow shaft portion adapted to receive a heat-transferring fluid, a second condenser communicably connected to the first named condenser, a rotary conveyor in said second named condenser, said conveyor also having a central hollow shaft portion adapted to receive a heat-transferring fluid and a discharge port in said second named condenser positioned adjacent the connection between said condensers, said conveyors being arranged to move material in the condensers towards the discharge port.

In testimony whereof we affix our signatures.

FRANK D. FENHAGEN.
FREDERICK H. RHODES.
THEODORE M. HESSER.